(12) United States Patent
Gu et al.

(10) Patent No.: US 9,881,537 B2
(45) Date of Patent: Jan. 30, 2018

(54) DISPLAY PANEL AND FLAT PANEL DISPLAY APPARATUS WITH TRANSMISSION LINES FOR CONNECTING GATE LINES TO CONTROL CIRCUIT

(71) Applicants: BOE Technology Group Co., Ltd., Beijing (CN); Hefei BOE Optoelectronics Technology Co., Ltd., Anhui (CN)

(72) Inventors: Honggang Gu, Beijing (CN); Xiaohe Li, Beijing (CN); Xianjie Shao, Beijing (CN); Qinghua Jiang, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 34 days.

(21) Appl. No.: 14/744,088

(22) Filed: Jun. 19, 2015

(65) Prior Publication Data
US 2016/0260370 A1    Sep. 8, 2016

(30) Foreign Application Priority Data
Mar. 6, 2015 (CN) .......................... 2015 1 0100837

(51) Int. Cl.
*G09G 3/20* (2006.01)
*G02F 1/1345* (2006.01)

(52) U.S. Cl.
CPC ............. *G09G 3/20* (2013.01); *G02F 1/1345* (2013.01); *G02F 2001/13456* (2013.01);
(Continued)

(58) Field of Classification Search
CPC ...... G09G 3/2003; G09G 3/30–3/3291; G09G 3/36–3/3696; G09G 2300/0426;
(Continued)

(56) References Cited

U.S. PATENT DOCUMENTS

| | | | | |
|---|---|---|---|---|
| 6,407,793 B1 * | 6/2002 | Liang | ................ | G02F 1/133514 |
| | | | | 349/106 |
| 2003/0001809 A1 * | 1/2003 | Hattori | .............. | G02F 1/134336 |
| | | | | 345/87 |

(Continued)

FOREIGN PATENT DOCUMENTS

| CN | 1719323 A | 1/2006 |
|---|---|---|
| CN | 101017258 A | 8/2007 |

(Continued)

OTHER PUBLICATIONS

First Office Action, including Search Report, for Chinese Patent Application No. 201510100837.8, dated Jan. 26, 2017, 13 pages.

(Continued)

*Primary Examiner* — Nathan Danielsen
(74) *Attorney, Agent, or Firm* — Westman, Champlin & Koehler, P.A.

(57) ABSTRACT

A display panel comprises: a set of gate lines; and a set of data lines and a set of transmission lines extending in substantially the same direction, the set of transmission lines being electrically connected to the set of gate lines, respectively. A flat panel display apparatus comprises: a set of gate lines; a set of data lines and a set of transmission lines extending in substantially the same direction, the set of transmission lines being electrically connected to the set of gate lines, respectively; and a control circuit electrically connected to the set of data lines and the set of transmission lines.

11 Claims, 4 Drawing Sheets

(52) U.S. Cl.
CPC ............... *G09G 2300/0408* (2013.01); *G09G 2300/0426* (2013.01); *G09G 2300/0452* (2013.01); *G09G 2310/0278* (2013.01); *G09G 2330/08* (2013.01)

(58) Field of Classification Search
CPC ....... G09G 2300/0452; G09G 2300/08; G09G 2300/0408; G09G 2310/0278; G02F 1/1345–1/13454; G02F 1/13458; G02F 2001/13456
See application file for complete search history.

(56) References Cited

U.S. PATENT DOCUMENTS

| | | | | |
|---|---|---|---|---|
| 2009/0279007 | A1* | 11/2009 | Shih | G09G 3/3655 349/37 |
| 2010/0066967 | A1* | 3/2010 | Takahashi | G02F 1/1345 349/143 |
| 2010/0171687 | A1* | 7/2010 | Chiang | G09G 3/3648 345/98 |
| 2013/0141660 | A1* | 6/2013 | Wang | G09G 3/3648 349/43 |
| 2013/0155034 | A1* | 6/2013 | Nakayama | G09G 3/3648 345/204 |
| 2014/0104148 | A1 | 4/2014 | Wang | |
| 2014/0240302 | A1* | 8/2014 | Chen | G09G 3/3614 345/212 |
| 2015/0156482 | A1* | 6/2015 | Sun | G09G 3/003 345/212 |
| 2016/0240117 | A1 | 8/2016 | Xu | |

FOREIGN PATENT DOCUMENTS

| | | |
|---|---|---|
| CN | 102540525 A | 7/2012 |
| CN | 102541335 A | 7/2012 |
| CN | 103995374 A | 8/2014 |

OTHER PUBLICATIONS

First Office Action from Chinese Patent Application No. 201510100837.8, dated Jun. 7, 2017, 13 pages.

* cited by examiner

DISPLAY PANEL AND FLAT PANEL DISPLAY APPARATUS WITH TRANSMISSION LINES FOR CONNECTING GATE LINES TO CONTROL CIRCUIT

CROSS-REFERENCE TO RELATED APPLICATION

This application claims the benefit of Chinese Patent Application No. 201510100837.8 filed on Mar. 6, 2015 in the State Intellectual Property Office of China, the whole disclosure of which is incorporated herein by reference.

BACKGROUND OF THE INVENTION

1. Field of the Invention

Embodiments of the present invention relate to a display panel and a flat panel display apparatus.

2. Description of the Related Art

A flat panel display apparatus comprises a plurality of pixel units arranged in an array and each provided with a thin film transistor switch element. As shown in FIG. 1, in a conventional flat panel display apparatus, thin film transistor switch elements each have a gate electrically connected to a first control circuit 10 through a gate line 1 and a source electrically connected to a second control circuit 20 through a data line 2. However, a frame of the flat panel display apparatus is relatively wide.

SUMMARY OF THE INVENTION

An object of embodiments of the present invention is to provide a display panel and a flat panel display apparatus to reduce a width of a frame of the flat panel display apparatus.

According to embodiments of the present invention, there is provided a display panel comprising: a set of gate lines; and a set of data lines and a set of transmission lines extending in substantially the same direction, the set of transmission lines being electrically connected to the set of gate lines, respectively.

According to other embodiments of the present invention, there is provided a flat panel display apparatus comprising: a set of gate lines; a set of data lines and a set of transmission lines extending in substantially the same direction, the set of transmission lines being electrically connected to the set of gate lines, respectively; and a control circuit electrically connected to the set of data lines and the set of transmission lines.

Figure 1:
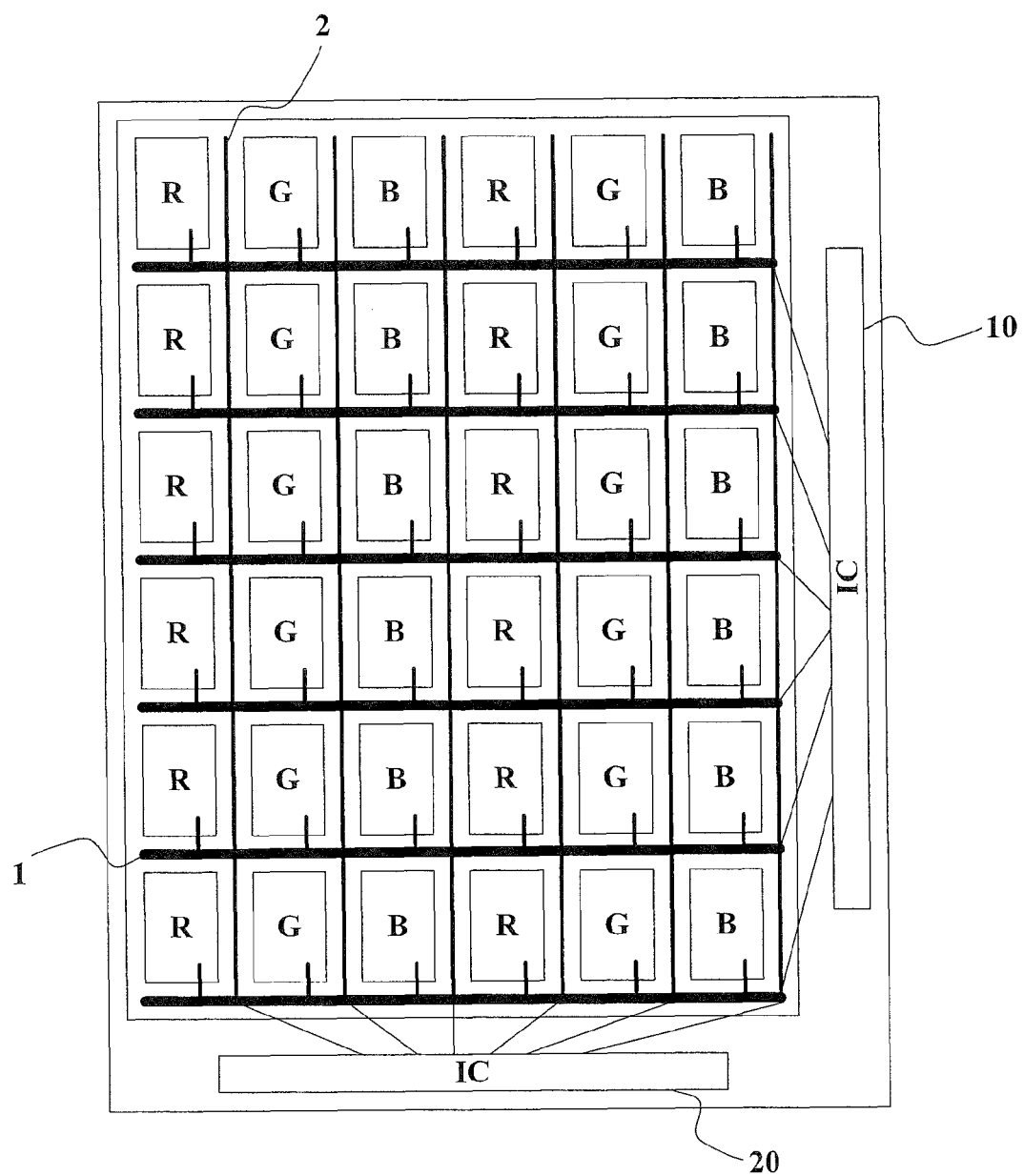
FIG. 1 is a schematic structural diagram of a conventional flat panel display apparatus.

The reference numerals in the drawings are listed as follows:

10—first control circuit;
20—second control circuit;
1—gate line:
2—data line;
3—transmission line:
4—control circuit;
5—boundary region; and
6—insulation layer via hole

DETAILED DESCRIPTION OF THE EMBODIMENTS

A further description of the invention will be made in detail as below with reference to embodiments of the present invention taken in conjunction with the accompanying drawings. The following embodiments are intended to explain the present invention and the present invention should not be construed as being limited to the embodiment set forth herein.

First Embodiment

Figure 2:
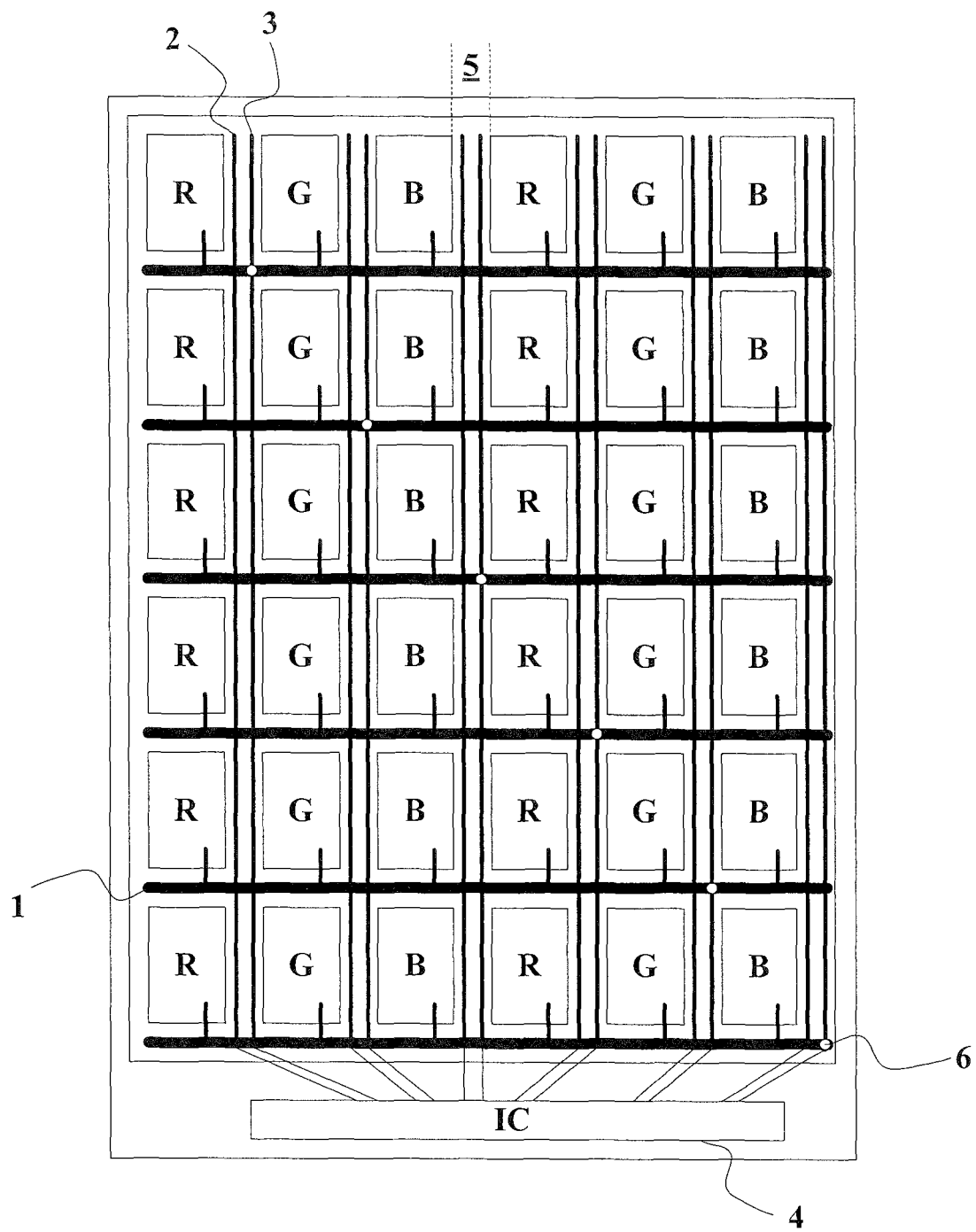
FIG. 2 is a schematic structural diagram of a flat panel display apparatus according to a first embodiment of the present invention.

Referring to FIG. 2, a display panel according to an embodiment of the present invention comprises:
a set of gate lines 1; and
a set of data lines 2 and a set of transmission lines 3 extending in substantially the same direction, the set of transmission lines 3 being electrically connected to the set of gate lines 1, respectively.

For example, the set of data lines 2 and the set of transmission lines 3 are adapted to be electrically connected to a control circuit 4 such as a single control circuit.

In these embodiments, specific types of the display panel are not limited. For example, the display panel may be a display panel of a thin film transistor liquid crystal display apparatus or an organic light-emitting diode display apparatus. Specifically, the display panel may be display panels of a flat panel display, a panel TV, a mobile telephone, a tablet computer, an electronic book and the like. Here, the display panel is not specifically limited.

Referring to FIG. 2, the gate lines 1 extend in a first direction, while the data lines 2 and the transmission lines 3 extend in a second direction. The first direction may be a transverse direction, while the second direction may be a longitudinal direction. Alternatively, the first direction may also be the longitudinal direction, while the second direction may be the transverse direction. In the embodiment shown in FIG. 2, the set of gate lines 1 extend in the transverse direction, while the set of data lines 2 and the set of transmission lines 3 extend in the longitudinal direction. The set of transmission lines 3 are electrically connected to the set of gate lines 1, respectively. For example, the transmission lines 3 are connected to the gate lines 1 in an one-to-one correspondence relationship. In other words, each of the transmission lines 3 transmits a signal to a corresponding one of the gate lines 1.

In these embodiments, the set of transmission lines 3 are electrically connected to the set of gate lines 1, respectively, while the control circuit 4 is electrically connected to both the set of data lines 2 and the set of transmission lines 3, thereby decreasing the number of the control circuits (two control circuits are used in the conventional display apparatus shown in FIG. 1 while only one control circuit 4 is used in the display apparatus according to these embodiments of the present invention). Therefore, dimensions of the frame which are occupied by the control circuits can be reduced, and thus a width of the frame of the flat panel display apparatus is decreased. An ultra-narrow-frame design and even a frame-free design of the flat panel display apparatus can be achieved. In addition, the reduction of the number of the control circuits also can decrease a production cost and simplify a production process.

As shown in FIG. 2, in the embodiment, a plurality of pixel units arranged in an array are bounded by the set of gate lines 1 and the set of data lines 2, and each transmission line 3 is located in a boundary region 5 of columns of the pixel units. In the boundary region 5 of the columns of the pixel units, there is one transmission line 3 in addition to the data line 2. Alternatively, each transmission line 3 may also be located in a boundary region of rows of the pixel units.

Referring to FIG. 2, in the embodiment, the display panel further comprises an insulation layer disposed between the transmission lines 3 and the gate lines 1, and insulation layer via holes 6 disposed in the insulation layer. The set of transmission lines 3 and the set of data lines 2 are disposed in the same layer. Each transmission line 3 is electrically connected to the corresponding gate line 1 through the insulation layer via hole 6. The transmission lines 3 and the data lines 2 may be made of the same material. During fabrication, the transmission lines 3 and the data lines 2 are formed by the same patterning process. A relative position between the layer where the data lines 2 and the transmission lines 3 are located and a layer where the gate lines 1 are located is not limited. For example, if a thin film transistor of the pixel unit is of a bottom-gate type, the layer where the data lines 2 and the transmission lines 3 are located is above the layer where the gate lines 1 are located; or if the thin film transistor of the pixel unit is of a top-gate type, the layer where the data lines 2 and the transmission lines 3 are located is below the layer where the gate lines 1 are located. Specifically, the insulation layer via hole 6 may be a gate insulation layer via hole in a gate insulation layer, or a passivation layer via hole in a passivation layer.

Figure 3:
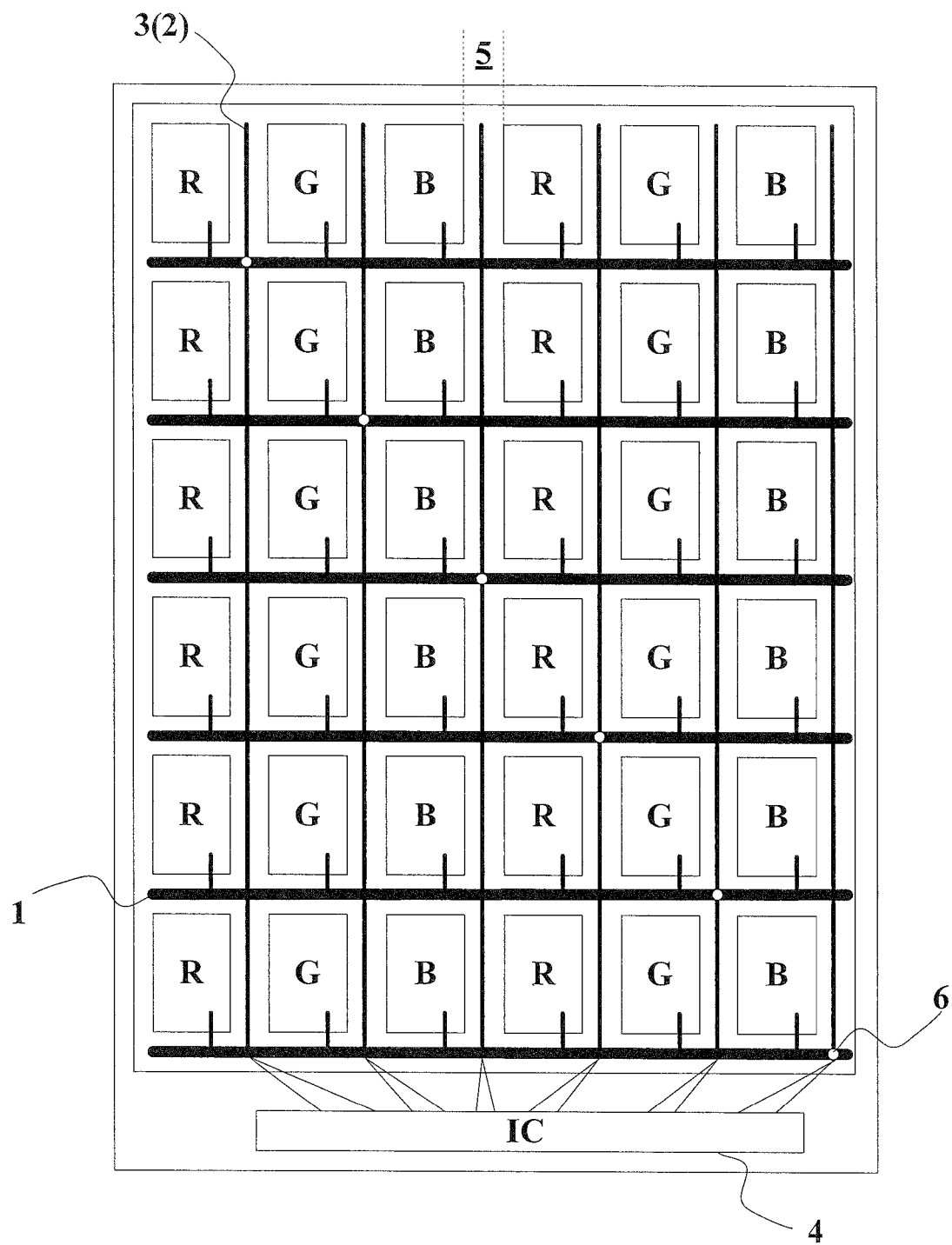
FIG. 3 is a schematic structural diagram of a flat panel display apparatus according to a second embodiment of the present invention.

Referring to FIG. 3, in another embodiment, the display panel further comprises an insulation layer disposed between the transmission lines 3 and the gate lines 1, and insulation layer via holes 6 disposed in the insulation layer. The set of transmission lines 3 and the set of data lines 2 are disposed in different layers. Each transmission line 3 is electrically connected to the corresponding gate line 1 through the insulation layer via hole 6. Specifically, the insulation layer via hole 6 may be a gate insulation layer via hole in a gate insulation layer, or a passivation layer via hole in a passivation layer. In an example, the set of transmission lines 3 and the set of data lines 2 are arranged opposite to one another, respectively, with an insulation layer interposed between the set of transmission lines 3 and the set of data lines 2.

In the embodiment shown in FIG. 2, the transmission lines 3 and the data lines 2 are disposed side by side in the same layer and the transmission lines 3 occupy a certain area of the boundary region 5, thereby affecting an aperture ratio of a pixel region to a certain degree. However, in the embodiment shown in FIG. 3, the set of transmission lines 3 and the set of data lines 2 are arranged opposite to one another, respectively. In other words, in the boundary region 5 of the columns of pixel units, the transmission line 3 is located above or below the data line 2, and is separated from the data line 2 by the insulation layer. The transmission line 3 does not additionally occupy an area of the boundary region 5. The boundary region 5 may be designed to be narrow. Therefore, the solution can effectively reduce an influence of the transmission line 3 on the aperture ratio of the pixel region.

Figure 4:
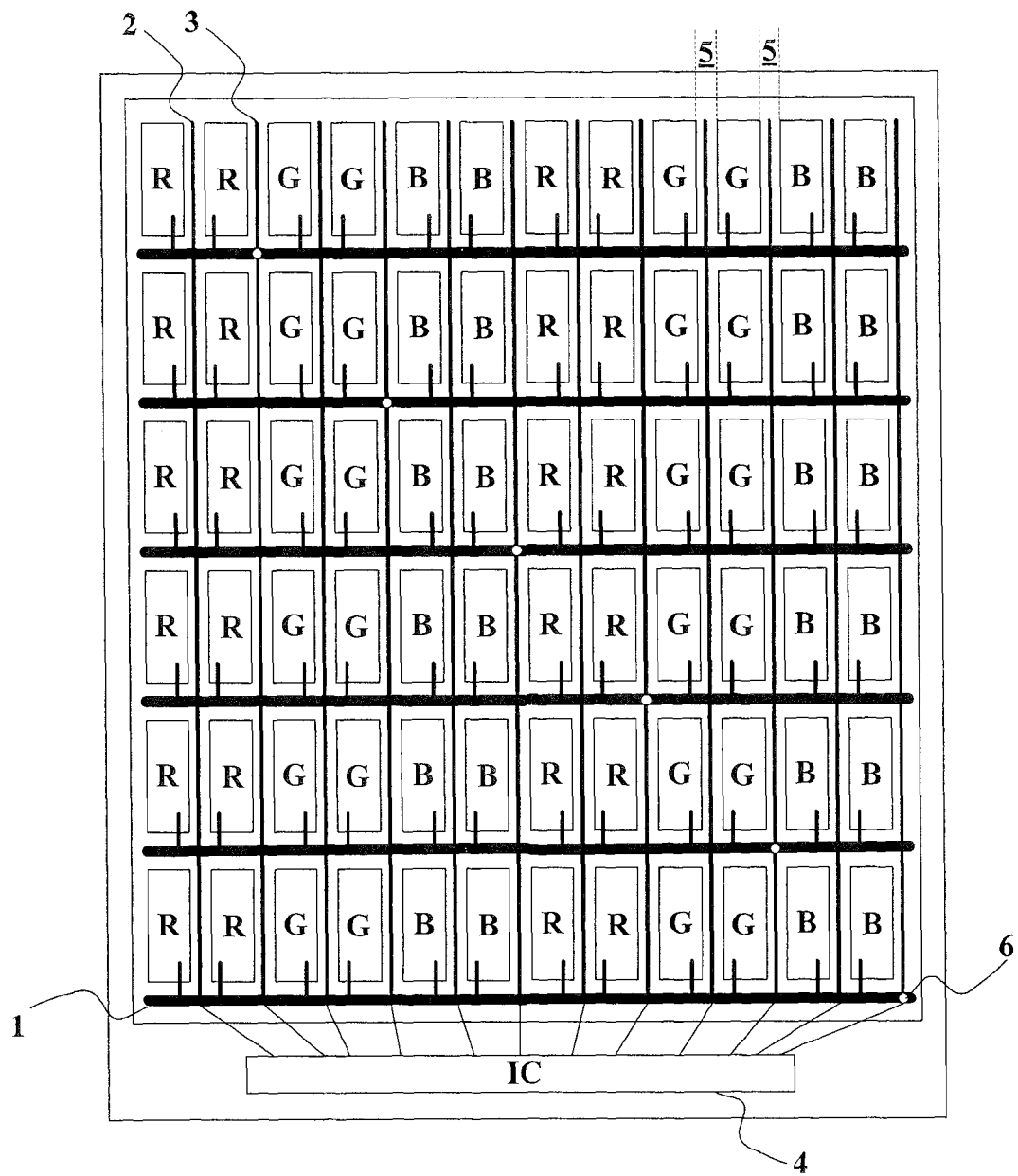
FIG. 4 is a schematic structural diagram of a flat panel display apparatus according to a third embodiment of the present invention.

As shown in FIG. 4, in a further embodiment, the set of data lines 2 and the set of transmission lines 3 are alternately disposed and spaced from one another. A plurality of pixel units arranged in an array is bounded by the set of data lines 2, the set of transmission lines 3, and the gate lines 1. Every two adjacent columns of pixel units of the plurality of pixel units have the same color and each data line 2 controls two adjacent columns of pixel units having the same color.

If one column of pixel units of the adjacent two columns of pixel units having the same color do not normally display, the abnormal display will not affect normal display of the other column of pixel units. Therefore, the display apparatus can still display a complete picture, thereby decreasing occurrence of bad display. For example, in an organic light-emitting diode display apparatus with the configuration, even if one column of pixel units of adjacent two columns of red pixel units cannot be illumined, this will not affect normal illumining of the other column of pixel units. Therefore, the display apparatus can still display a complete picture. In addition, since the number of pixel units is increased in this design, a quality of a display picture can be apparently improved.

In this embodiment, the set of transmission lines 3 and the set of data lines 2 may be disposed in the same layer or in different layers. For example, the display panel further comprises an insulation layer disposed between the transmission lines 3 and the gate lines 1, and insulation layer via holes 6 disposed in the insulation layer. The set of transmission lines 3 and the set of data lines 2 are disposed in the same layer. Each transmission line 3 is electrically connected to the corresponding gate line 1 through the insulation layer via hole 6. In this way, the transmission lines 3 and the data lines 2 may be formed by the same patterning process during fabrication. Therefore, a manufacture cost will not increase much. The layer where the data lines 2 and the transmission lines 3 are located may be located above or below the layer where the gate lines 1 are located. Specifically, the insulation layer via hole 6 may be a gate insulation layer via hole in a gate insulation layer, or a passivation layer via hole in a passivation layer.

Second Embodiment

As shown in FIG. 2, a flat panel display apparatus according to an embodiment of the present invention comprises:
a set of gate lines 1;
a set of data lines 2 and a set of transmission lines 3 extending in substantially the same direction, the set of transmission lines 3 being electrically connected to the set of gate lines 1, respectively; and
a control circuit 4, such as a single control circuit, electrically connected to the set of data lines 2 and the set of transmission lines 3.

In these embodiments, specific types of the flat panel display apparatus are not limited. For example, the flat panel display apparatus may be a thin film transistor liquid crystal display apparatus or an organic light-emitting diode display apparatus. Specifically, the flat panel display apparatus may be a flat panel display, a panel TV, a mobile telephone, a tablet computer, an electronic book and the like. Here, the flat panel display apparatus is not specifically limited.

Referring to FIG. 2, the gate lines 1 extend in a first direction, while the data lines 2 and the transmission lines 3 extend in a second direction. The first direction may be a transverse direction, while the second direction may be a longitudinal direction. Alternatively, the first direction may also be the longitudinal direction, while the second direction may be the transverse direction. In the embodiment shown in FIG. 2, the set of gate lines 1 extend in the transverse direction, while the set of data lines 2 and the set of transmission lines 3 extend in the longitudinal direction. The set of transmission lines 3 are electrically connected to the set of gate lines 1, respectively. For example, the transmission lines 3 are connected to the gate lines 1 in a one-to-one correspondence relationship. In other words, each of the transmission lines 3 transmits a signal to a corresponding one of the gate lines 1.

Referring to FIG. 2, in the embodiment, the control circuit 4 is located under a display area of the flat panel display apparatus. However, in other embodiments, a position of the control circuit relative to the display area may also differ from that shown in FIG. 2 depending on a different placing manner of the flat panel display apparatus. For example, the control circuit is located on an upper side, a left side, or a right side of the display area of the flat panel display apparatus.

In the embodiment, the set of transmission lines 3 are electrically connected to the set of gate lines 1, respectively, while the control circuit 4 is electrically connected to both the set of data lines 2 and the set of transmission lines 3, thereby decreasing the number of the control circuits (two control circuits are used in the conventional display apparatus shown in FIG. 1 while only one control circuit 4 is used in the display apparatus according to these embodiments of the present invention). Therefore, dimensions of the frame which are occupied by the control circuits can be reduced, and thus a width of the frame of the flat panel display apparatus is decreased. An ultra-narrow-frame design and even a frame-free design of the flat panel display apparatus can be achieved. In addition, the reduction of the number of the control circuits also can decrease a production cost and simplify a production process.

In addition, one control circuit 4 transmits signals to the gate lines 1 and the data lines 2 simultaneously. Therefore, the signals are transmitted stably and reliably. Since an influence of a temperature on the control circuit 4 is small, the flat panel display apparatus can be applied to particular environments such as a vehicle-mounted one, and thus its field of application is wide.

As shown in FIG. 2, in the embodiment, a plurality of pixel units arranged in an array are bounded by the set of gate lines 1 and the set of data lines 2, and each transmission line 3 is located in a boundary region 5 of columns of the pixel units. In the boundary region 5 of the columns of the pixel units, there is one transmission line 3 in addition to the data line 2. Alternatively, each transmission line 3 may also be located in a boundary region of rows of the pixel units.

Referring to FIG. 2, in the embodiment, the flat panel display apparatus further comprises an insulation layer disposed between the transmission lines 3 and the gate lines 1, and insulation layer via holes 6 disposed in the insulation layer. The set of transmission lines 3 and the set of data lines 2 are disposed in the same layer. Each transmission line 3 is electrically connected to the corresponding gate line 1 through the insulation layer via hole 6. The transmission lines 3 and the data lines 2 may be made of the same material. During fabrication, the transmission lines 3 and the data lines 2 are formed by the same patterning process. A relative position between the layer where the data lines 2 and the transmission lines 3 are located and a layer where the gate lines 1 are located is not limited. For example, if a thin film transistor of the pixel unit is of a bottom-gate type, the layer where the data lines 2 and the transmission lines 3 are located is above the layer where the gate lines 1 are located; or if the thin film transistor of the pixel unit is of a top-gate type, the layer where the data lines 2 and the transmission lines 3 are located is below the layer where the gate lines 1 are located. Specifically, the insulation layer via hole 6 may be a gate insulation layer via hole in a gate insulation layer, or a passivation layer via hole in a passivation layer.

Referring to FIG. 3, in another embodiment, the flat panel display apparatus further comprises an insulation layer disposed between the transmission lines 3 and the gate lines 1, and insulation layer via holes 6 disposed in the insulation layer. The set of transmission lines 3 and the set of data lines 2 are disposed in different layers. Each transmission line 3 is electrically connected to the corresponding gate line 1 through the insulation layer via hole 6. Specifically, the insulation layer via hole 6 may be a gate insulation layer via hole in a gate insulation layer, or a passivation layer via hole in a passivation layer. In an example, the set of transmission lines 3 and the set of data lines 2 are arranged opposite to one another, respectively, with an insulation layer interposed between the set of transmission lines 3 and the set of data lines 2.

In the embodiment shown in FIG. 2, the transmission lines 3 and the data lines 2 are disposed side by side in the same layer and the transmission lines 3 occupy a certain area of the boundary region 5, thereby affecting an aperture ratio of a pixel region to a certain degree. However, in the embodiment shown in FIG. 3, the set of transmission lines 3 and the set of data lines 2 are arranged opposite to one another, respectively. In other words, in the boundary region 5 of the columns of pixel units, the transmission line 3 is located above or below the data line 2, and is separated from the data line 2 by the insulation layer. The transmission line 3 does not additionally occupy an area of the boundary region 5. The boundary region 5 may be designed to be narrow. Therefore, the solution can effectively reduce an influence of the transmission line 3 on the aperture ratio of the pixel region.

As shown in FIG. 4, in a further embodiment, the set of data lines 2 and the set of transmission lines 3 are alternately disposed and spaced from one another. A plurality of pixel units arranged in an array is bounded by the set of data lines 2, the set of transmission lines 3, and the gate lines 1. Every two adjacent columns of pixel units of the plurality of pixel units have the same color and each data line 2 controls two adjacent columns of pixel units having the same color.

If one column of pixel units of the adjacent two columns of pixel units having the same color do not normally display, the abnormal display will not affect normal display of the other column of pixel units. Therefore, the display apparatus can still display a complete picture, thereby decreasing occurrence of bad display. For example, in an organic light-emitting diode display apparatus with the configuration, even if one column of pixel units of adjacent two columns of red pixel units cannot be illumined, this will not affect normal illumining of the other column of pixel units. Therefore, the display apparatus can still display a complete picture. In addition, since the number of pixel units is increased in this design, a quality of a display picture can be apparently improved.

In this embodiment, the set of transmission lines 3 and the set of data lines 2 may be disposed in the same layer or in different layers. For example, the flat panel display apparatus further comprises an insulation layer disposed between the transmission lines 3 and the gate lines 1, and insulation layer via holes 6 disposed in the insulation layer. The set of transmission lines 3 and the set of data lines 2 are disposed in the same layer. Each transmission line 3 is electrically connected to the corresponding gate line 1 through the insulation layer via hole 6. In this way, the transmission lines 3 and the data lines 2 may be formed by the same patterning process during fabrication. Therefore, a manufacture cost will not increase much. The layer where the data lines 2 and the transmission lines 3 are located may be located above or below the layer where the gate lines 1 are located. Specifically, the insulation layer via hole 6 may be a gate insulation layer via hole in a gate insulation layer, or a passivation layer via hole in a passivation layer.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents.

What is claimed is:

1. A display panel comprising:
   a set of gate lines; and
   a set of data lines and a set of transmission lines extending in substantially the same direction, the set of transmission lines being electrically connected to the set of gate lines, respectively, wherein:
      the set of data lines and the set of transmission lines are alternately disposed and spaced from one another, and a plurality of pixel units arranged in an array are bounded by the set of data lines, the set of transmission lines, and the set of gate lines,
      each of the set of data lines is disposed between two adjacent columns of pixel units of the plurality of pixel units and is configured to control the two adjacent columns of pixel units, and the two adjacent columns of pixel units have the same color,
      in the two adjacent columns of pixel units having the same color, two pixel units in the same row are configured to be controlled by the same data line and the same gate line, and
      only one of the set of gate lines is disposed between every two adjacent rows of pixel units of the plurality of pixel units.

2. The display panel of claim 1, wherein:
   the set of data lines and the set of transmission lines are adapted to be electrically connected to a control circuit.

3. The display panel of claim 1, wherein:
   the set of transmission lines and the set of data lines are disposed in the same layer.

4. The display panel of claim 1, wherein:
   the set of transmission lines and the set of data lines are disposed in different layers.

5. A flat panel display apparatus comprising:
   a set of gate lines;
   a set of data lines and a set of transmission lines extending in substantially the same direction, the set of transmission lines being electrically connected to the set of gate lines, respectively; and
   a control circuit electrically connected to the set of data lines and the set of transmission lines, wherein:
      the set of data lines and the set of transmission lines are alternately disposed and spaced from one another, and a plurality of pixel units arranged in an array are bounded by the set of data lines, the set of transmission lines, and the set of gate lines,
      each of the set of data lines is disposed between two adjacent columns of pixel units of the plurality of pixel units and is configured to control the two adjacent columns of pixel units, and the two adjacent columns of pixel units have the same color,
      in the two adjacent columns of pixel units having the same color, two pixel units in the same row are configured to be controlled by the same data line and the same gate line, and
      only one of the set of gate lines is disposed between every two adjacent rows of pixel units of the plurality of pixel units.

6. The flat panel display apparatus of claim 5, wherein:
   the set of transmission lines and the set of data lines are disposed in the same layer.

7. The flat panel display apparatus of claim 6 further comprising:
   an insulation layer disposed between the transmission lines and the gate lines, and
   insulation layer via holes disposed in the insulation layer, wherein each transmission line is electrically connected to the corresponding gate line through the insulation layer via hole.

8. The flat panel display apparatus of claim 5, wherein:
   the set of transmission lines and the set of data lines are disposed in different layers.

9. The flat panel display apparatus of claim 8 further comprising:
   an insulation layer disposed between the transmission lines and the gate lines, and
   insulation layer via holes disposed in the insulation layer, wherein each transmission line is electrically connected to the corresponding gate line through the insulation layer via hole.

10. The flat panel display apparatus of claim 5, wherein:
    the control circuit is located under a display area of the flat panel display apparatus.

11. The flat panel display apparatus of claim 5, wherein:
    the flat panel display apparatus comprises a thin film transistor liquid crystal display apparatus or an organic light-emitting diode display apparatus.

* * * * *